United States Patent [19]  [11]  4,186,822
Khuntia et al.  [45]  Feb. 5, 1980

[54] DISC BRAKE PACK WEAR INDICATOR

[75] Inventors: Natabara Khuntia, Hudson; Charles W. Rader, Willowick, both of Ohio

[73] Assignee: General Motors Corporation, Detroit, Mich.

[21] Appl. No.: 919,766

[22] Filed: Jun. 28, 1978

[51] Int. Cl.² .............................................. F16D 66/02
[52] U.S. Cl. ................... 188/1 A; 116/208; 188/72.3; 192/30 W
[58] Field of Search .................. 188/1 A, 72.3, 216; 116/208; 192/30 W

[56] References Cited
U.S. PATENT DOCUMENTS

| | | | |
|---|---|---|---|
| 1,948,190 | 2/1934 | Shelor | 188/723 X |
| 3,018,852 | 1/1962 | Stanton | 188/1 A X |
| 3,301,359 | 1/1967 | Cole et al. | |
| 3,533,491 | 10/1970 | Svenson | 188/1 A |
| 3,768,603 | 10/1973 | Hoffman | 188/72.3 |
| 3,983,964 | 10/1976 | Beals et al. | 188/1 A |

Primary Examiner—George E. A. Halvosa
Attorney, Agent, or Firm—D. D. McGraw

[57] ABSTRACT

The disc brake disclosed is of the type used for heavy equipment, including off-the-road vehicles. It is oil cooled, with the disc pack being enclosed in a housing. In brakes of this type which are currently on the market, the wear of the disc pack can be checked only by disassembly of the brake assembly. The disclosure shows an arrangement wherein pack wear can be checked without requiring such disassembly. The bosses in which piston retracting mechanisms are provided are convenient for such purposes. One or more of these bosses is provided with a tapped access hole after having the boss end surface machined to a smooth finish. When the brake disc pack is new, the service brake piston and the parking brake release piston cavities are pressurized, causing the parking brake piston to back off completely. The service brake piston squeezes the disc pack against the parking brake piston and pulls the service brake piston return spring guide pins with it. The distance between the headed end of the guide pin and the outside boss machined surface is measured precisely. The measurement is then stamped on the machined surface for future reference and the tapped hole is plugged. To measure wear at any time thereafter the plug is removed, the pressure chambers pressurized and the distance again measured. This measured distance is compared with the measurement previously stamped on the housing. If the difference between the measurements is within the specified wear limit, the disc brake pack need not be replaced. If the difference between the measurements exceeds the specified wear limit, new disc plates are required.

1 Claim, 4 Drawing Figures

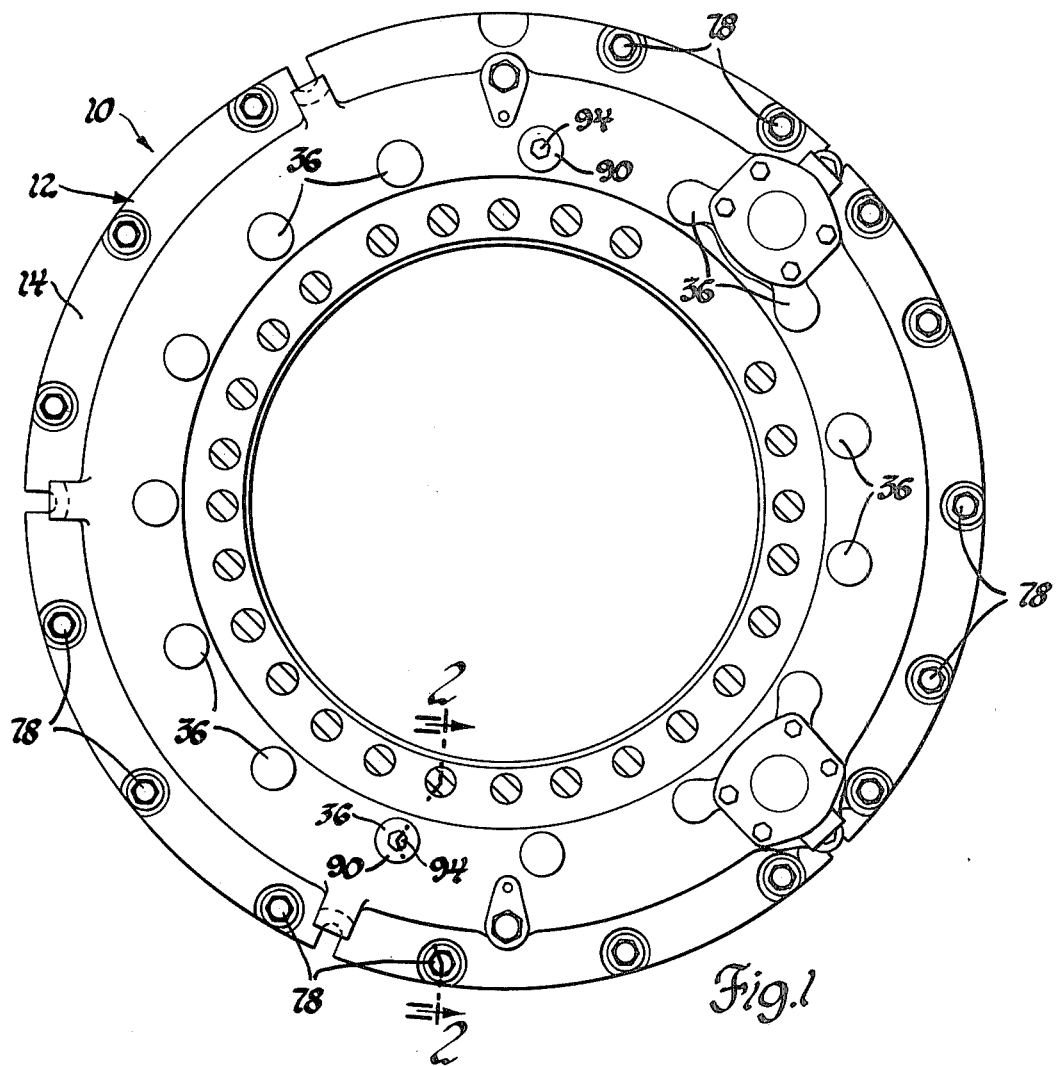
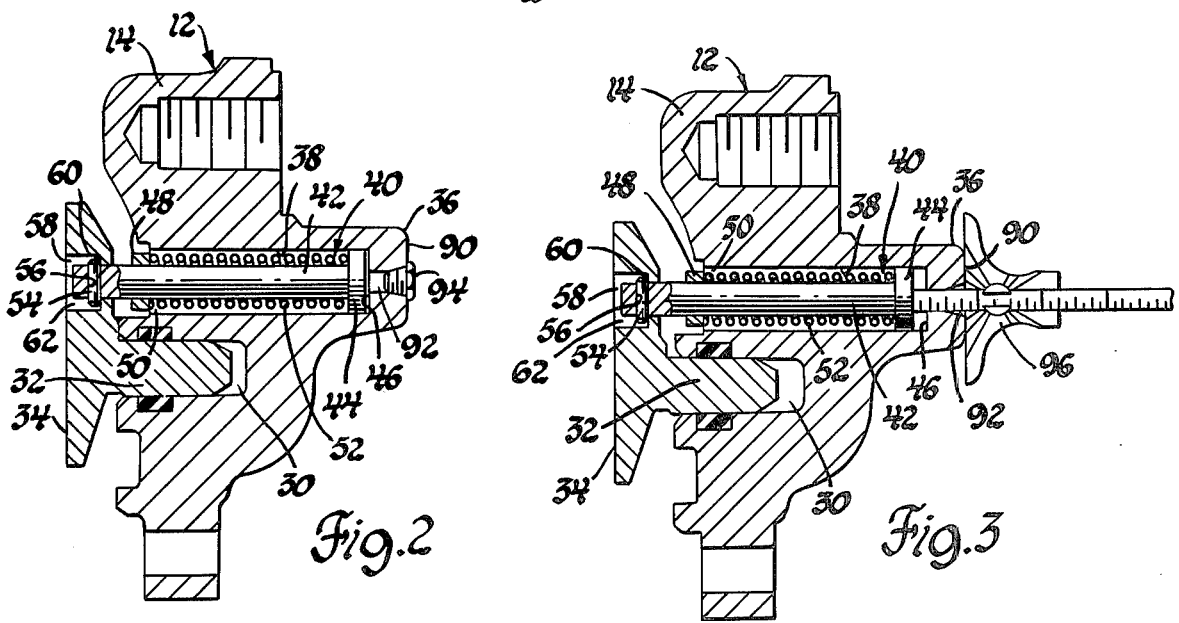

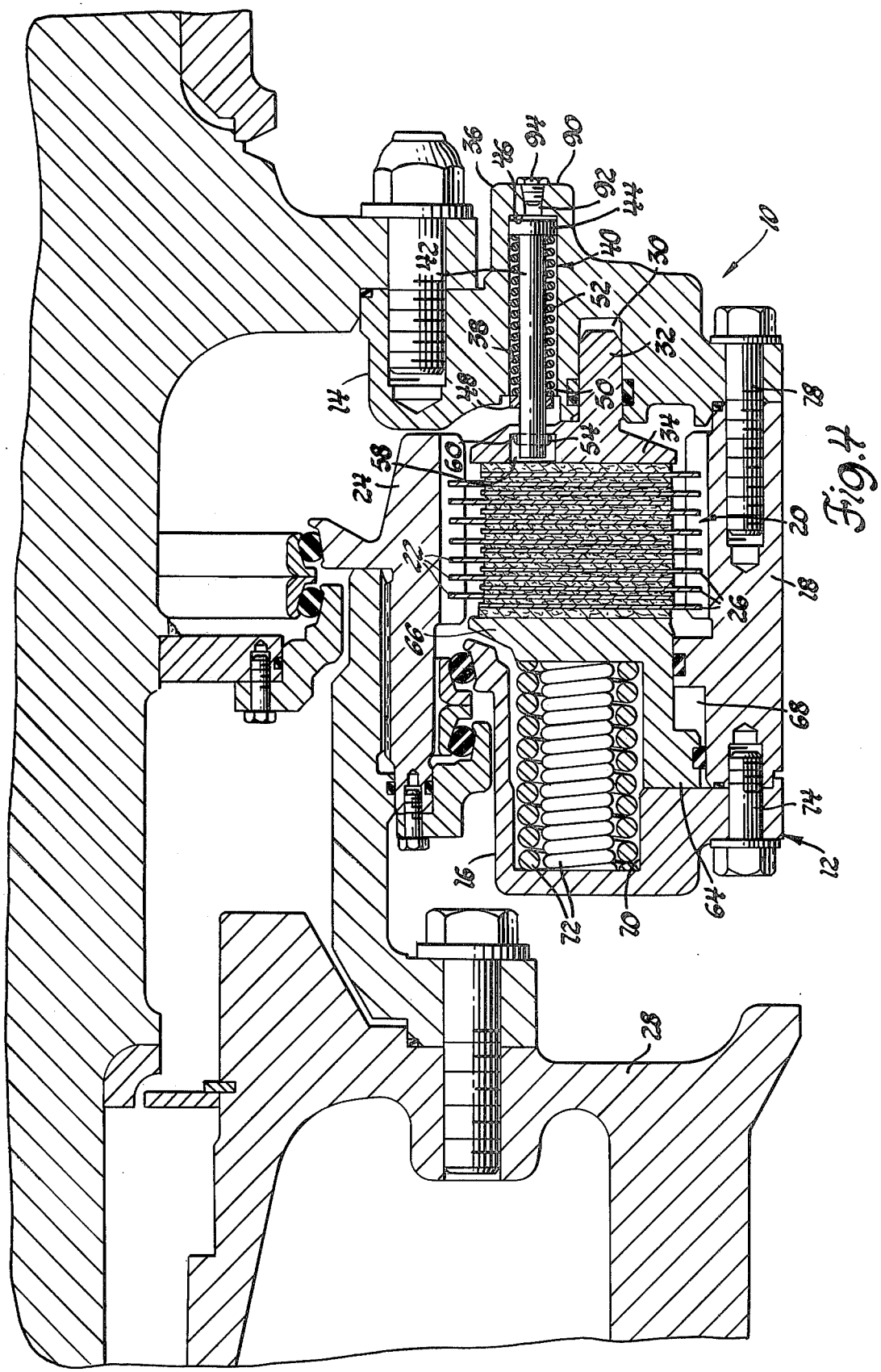

DISC BRAKE PACK WEAR INDICATOR

The invention relates to an arrangement for checking the wear of the disc plates in an annular disc brake without requiring disassembly of the entire brake. This is accomplished by setting up the distance that the service piston return spring guide pins move when the disc brake pack is new, establishing a wear limit, and measuring the distance that one or more guide pins move at a later date. The difference between the measurements establishes the amount of wear. This arrangement only requires the removal of one or more plugs, the insertion of a depth measuring device, reading the device and comparing the reading to the reading obtained when the brake pack was new, to determine whether or not the wear limit has been exceeded. If it has not, the inspector only needs to replace the plug or plugs and measure again at a still later date after further use. Prior brakes of this type, such as that shown in U.S. Pat. No. 3,301,359, required disassembly of the brake to inspect the disc brake pack for wear.

IN THE DRAWINGS

FIG. 1 is an elevation view with parts in section of an annular disc brake assembly embodying the invention.

FIG. 2 is a cross section view taken in the direction of arrows 2—2 of FIG. 1 and illustrating the brake assembly in its released position.

FIG. 3 is a view similar to FIG. 2 with the brake assembly in its actuated condition and the depth gauge measuring the amount of movement required to engage the brake assembly.

FIG. 4 is a cross section view of the brake assembly of FIG. 1 showing the brake assembly in the assembled condition with the service brake and the parking brake released.

The disc brake assembly 10 is of the heavy duty type commonly used in industrial vehicles, and particularly off-the-road vehicles. The assembly includes a housing 12 assembled from several housing sections. As better seen in FIG. 4, the housing includes housing sections 14, 16 and 18. The brake assembly includes a disc pack 20 formed of interleaved plates with one set of plates 22 being splined on a rotatable support member 24 and the other set of plates 26 being splined to housing section 18. Support member 24 is arranged to rotate with the wheel 28 to be braked. The housing 12 is attached to a fixed portion of the vehicle.

Housing section 14 has an annular pressure chamber 30 formed therein and opening toward housing section 16. An annular piston 32 is reciprocably received in chamber 30 to define therewith a cavity for introduction of pressurized fluid to actuate the brake. Piston 32 has a plate engaging section 34 and is arranged so that when the piston is actuated the disc pack 20 will be subjected to brake actuating force. A series of bosses 36 is provided on housing section 14 and each boss is formed with a bore 38 opening toward the disc pack 20. A piston retracting mechanism 40 is provided inside each bore 38. This mechanism includes a return spring guide pin 42 having a head 44 reciprocably movable in the bore end 46, a bore cover 48 covering the open end 50 of bore 38 and suitably secured to housing section 14, and a piston return spring 52 which is a compression spring receiving pin 42 therethrough. One end of spring 52 engages pin head 44 and the other end engages the bore cover 48 so that the spring continually urges the pin toward bore end 46. The retracting mechanism 40 also includes a cross pin 54, which is longer than the diameter of pin 42 and extends through a cross passage 56 formed near the opposite end of the pin 42 from pin head 44. The end of the pin 42 containing passage 56 extends through a stepped hole 58 formed in a part of piston 32 and having a shoulder 60 facing the disc pack 20. The cross pin 54 is contained within the enlarged portion 62 of hole 58 and engages shoulder 60 so that the retracting force of spring 52 is exerted on piston 32 and tends to move the piston in the retracting direction to disengage the disc pack 20. It can be seen that when brake actuating pressure in chamber 30 is released, the force of all of the springs 52 in all of the bores 38 will move piston 32 away from the disc pack, releasing the brake. The piston is returned to its retracted position in which it engages a part of housing section 14.

Housing section 16 has an annular brake apply piston 64 reciprocably received therein. The piston has a plate engaging section 66 which is on the opposite side of the disc pack 20 from the plate engaging section 34 of piston 32. Piston 64 and housing section 18 are constructed and arranged to define therebetween a pressure chamber 68 which when pressurized will permit pressure to act on piston 64 to move the piston in a brake releasing direction. A series of cylinders 70 formed in housing section 16 contains brake apply springs 72. As illustrated, each cylinder 70 has two such brake apply springs. The springs engage housing section 16 in cylinder 70 and also act on the back side of the plate engaging section 66 of piston 64 to urge that piston toward brake actuating relation with disc pack 20. Housing section 16 is secured to housing section 18 by a series of bolts 74. Bolts 78 are similar to bolts 74 and attach housing section 14 to housing section 18.

During normal brake operation, with the vehicle running, pressure is maintained in chamber 68 to hold off the parking brake mechanism by moving piston 64 against housing section 16 and compressing the parking brake apply springs 72. The service brakes are actuated by delivering fluid pressure to service brake chamber 30 to move the service piston 32 and compress the disc pack 20 against the plate engaging section 66 of piston 64. Brake actuation causes compression of springs 52 of retracting mechanisms 40. Upon release of the service brake pressure in chamber 30, springs 52 return service piston 32 to the brake released position. When the vehicle is to be parked, the pressure in chamber 68 is released and springs 72 move piston 64 to compress the disc pack 20 against the plate engaging section 34 of piston 32. Piston 32 under these conditions is grounded against housing section 14 so that it provides a suitable reaction plate for parking purposes.

In the particular brake shown, two of the bosses 36 located at substantially diametrically opposite points on the brake assembly have their ends 90 machined off to provide a smooth surface for use in measurement. The surface is perpendicular to the axis of the associated bore 38. An opening 92 is drilled through each boss end so that it is coaxial with each bore 38. The opening 92 provides an access hole for insertion of a measuring instrument. In normal brake operation a plug 94 is threaded into each opening 92 to seal each bore 38. The plugs are shown in FIGS. 1, 2 and 4.

When the disc brake pack is new, the brake assembly is actuated by pressurizing chambers 30 and 68. The pressure in chamber 68 moves piston 64 leftwardly against the force of springs 72 until the piston is grounded against housing section 16. The plate engaging section 66 of piston 64 then acts as a fixed member against which the disc pack 20 may be compressed. The service piston 32 is moved to compress the disc brake pack by pressure in chamber 30. This movement of piston 32 carries the piston return spring guide pins 42 with the piston, compressing springs 52. A suitable depth gauge 96 is inserted through the opening 92 after plug 94 has been removed and the depth from the machined boss end 90 to the pin head 44 is accurately measured. This measurement is stamped on the brake housing, preferably on the machined surface 90 for later reference. After the depth gauge is removed, the plug 94 is re-inserted. When two such inspection spots are provided as shown in FIG. 1, the measured depth is established and recorded for each position.

After the brake has been in use for some time and when it is desired to inspect the assembly to determine the amount of disc pack wear, it has previously been necessary to completely disassemble the brake. With the arrangement embodying the invention, the brake may be readily inspected for wear in the field. It only requires the use of a depth gauge, the information previously established, and the amount of allowable wear. To measure brake wear in the field, the brake is actuated as before by pressurizing chambers 30 and 68. While being held in the fully actuated position, the plugs 94 are removed and the depth gauge is used to establish the depth from each machined surface 90 to each pin head 44 in the manner shown in FIG. 3. This measured distance is compared with the measurement previously stamped on the housing. As long as the difference between measurements does not exceed the specified wear limit, no replacement of the discs are needed. The access openings 92 then only need to be replugged with plugs 94 as before. If the measured distance is compared with the measurement obtained when the brake assembly was new and the difference exceeds the specified wear limit, the inspector then knows that disc brake pack wear is sufficient to require replacement. Only then must the disc brake assembly be disassembled because of disc pack wear.

What is claimed is:

1. In a disc brake having a housing, a pressure chamber formed in said housing, a bore for a piston retracting mechanism formed in said housing, a piston sealingly and reciprocably mounted in said pressure chamber for brake actuation by pressure introduced into said chamber, said piston having a stepped hole in axial alignment with said bore and having a shoulder therein, and a piston retracting mechanism in said bore and hole, said piston retracting mechanism including a return spring guide pin having a head on one end in one end of said bore, a compression piston return spring having one end engaging said guide pin head and the other end engaging a bore cover secured to said housing, said guide pin extending into said piston stepped hole, a cross passage extending through said guide pin and located in said piston stepped hole, and a cross pin in said cross passage of greater length than the diameter of said guide pin and normally engaging said shoulder of said stepped hole and transferring piston retracting force exerted by said spring to urge retraction of said piston, the improvement comprising the combination of: an opening in said housing opening axially into said bore at said one end containing said guide pin head, a selectively removable plug in said opening and normally closing said bore, and means selectively inserted through said opening while said plug is removed and when so inserted engaging said guide pin head with said brake actuated and measuring the amount of movement of said guide pin head relative to said housing required for brake actuation, the amount of movement being a function of brake wear, thus determining the condition of brake wear without disassembly and visual inspection of the brake, said means being removed after determination of the condition of brake wear and said plug then being replaced to close said bore one end.

* * * * *